United States Patent [19]

Yagishita et al.

[11] Patent Number: 4,931,509
[45] Date of Patent: Jun. 5, 1990

[54] CURABLE ACRYLATE-TYPE ELASTOMER COMPOSITION

[75] Inventors: Shigelu Yagishita, Kawasaki; Masatoshi Sugimoto; Tomoaki Okita, both of Haruhi, all of Japan

[73] Assignees: Nippon Zeon Co., Ltd., Tokyo; Toyoda Gosei Co., Ltd., Aichi, both of Japan

[21] Appl. No.: 33,795

[22] Filed: Apr. 3, 1987

[30] Foreign Application Priority Data

Apr. 8, 1986 [JP] Japan .................. 61-79115

[51] Int. Cl.$^5$ .......................... C08L 9/02; C08F 8/30; C08F 8/14
[52] U.S. Cl. .................. 525/208; 525/327.3; 525/340; 525/379; 525/386
[58] Field of Search ............... 525/379, 327.3, 340, 525/208, 194, 386

[56] References Cited

U.S. PATENT DOCUMENTS 3,294,749 12/1966 Pratt ........................... 528/93
3,894,112 7/1975 Pagel .
4,650,834 3/1987 Yagishita ..................... 525/386

*Primary Examiner*—Christopher Henderson
*Attorney, Agent, or Firm*—Sherman and Shalloway

[57] ABSTRACT

A curable elastomeric composition comprising an epoxy group-containing acrylate-type elastomer in combination with (1) a polycarboxylic acid or its anhydride, (2) a quaternary ammonium or phosphonium salt and (3) a urea.

13 Claims, No Drawings

CURABLE ACRYLATE-TYPE ELASTOMER COMPOSITION

This invention relates to an epoxy group-containing acrylate-type elastomer composition, and more specifically, it pertains to an epoxy group-containing acrylate-type elastomer composition having excellent processing stability to early vulcanization and gives a vulcanizate having excellent mechanical properties, heat-aging resistance and permanent compression set.

Acrylate-type elastomers are known to have excellent thermal resistance, oil resistance and weatherability, and acrylate-type elastomers containing epoxy groups as a crosslinking site usually find practical applications. Generally, polyamines, diamine carbamates, salts of organic carboxylic acids, dithiocarbamic acid salts, etc. have been used as vulcanization systems for epoxy group-containing acrylate-type elastomers. When polyamines or diamine carbamates are used, the rate of vulcanization is fast and the elastomers tend to undergo scorching in the step of kneading. The use of ammonium salts of organic carboxylic acids and dithiocarbamates can give a compound having stability against scorching because the rate of vulcanization is relatively slow. But to obtain a good permanent compression set, post-curing for a long period of time is required.

Various vulcanization methods have been proposed in an attempt to remove these defects. For example, Japanese Laid-Open Patent Publication No. 145727/1980 discloses a vulcanization system composed of phthalic anhydride and a specific imidazole compound. Japanese Laid-Open Patent Publication No. 177045/1982 discloses a vulcanization system comprising a guanidine compound and sulfur or a sulfur compound. These vulcanization systems are stable to scorching but have the defect that the resulting vulcanizates require post-curing for a relatively long period of time in order to obtain a good permanent compression set.

It is an object of this invention to provide a vulcanization system free from the aforesaid defects.

The present inventors have made extensive investigations in order to achieve this object, and have found that by using a vulcanization system composed of (1) a polycarboxylic acid or its anhydride, (2) a quaternary ammonium or phosphonium salt and (3) a urea in the vulcanization of an epoxy group-containing acrylate-type elastomer, the elastomer has excellent processing stability against early vulcanization and a vulcanizate having excellent mechanical properties, heat-aging resistance and permanent compression set can be obtained.

Thus, according to this invention, there is provided a curable elastomeric composition comprising an epoxy group-containing acrylate-type elastomer in combination with (1) a polycarboxylic acid or its anhydride, (2) a quaternary ammonium or phosphonium salt and (3) a urea.

The epoxy group-containing acrylate elastomer used in this invention can be obtained by polymerizing 0.1 to 10% by weight, preferably 0.5 to 3% by weight, of an epoxy group-containing monomer as a crosslinking site, 30 to 99.9% by weight of at least one monomer selected from alkyl acrylates and alkoxyalkyl acrylates and 0 to 70% by weight of at least one monomer having a terminal vinyl or vinylidene group copolymerizable with the above monomers by a known method.

Examples of the epoxy group-containing monomer used as a crosslinking site are glycidyl acrylate, glycidyl methacrylate, vinyl glycidyl ether, allyl glycidyl ether and methallyl glycidyl ether. Glycidyl acrylate and glycidyl methacrylate are preferred.

Examples of the alkyl acrylates copolymerizable with the epoxy group-containing monomer are alkyl acrylates having 1 to 8 carbon atoms in the alkyl moiety, such as methyl acrylate, ethyl acrylate, propyl acrylate, butyl acrylate, 2-ethylhexyl acrylate and n-octyl acrylate.

Examples of the alkoxyalkyl acrylates are alkoxyalkyl acrylates having 1 to 4 carbon atoms in each of the alkoxy and alkylene moieties, such as methoxymethyl acrylate, methoxyethyl acrylate, ethoxyethyl acrylate, butoxyethyl acrylate and methoxyethoxyethyl acrylate.

Examples of the monomers having a terminal vinyl or vinylidene group copolymerizable with the epoxy group-containing monomer include vinyl esters such as vinyl acetate, vinyl propionate and vinyl butyrate, alpha-monolefins such as ethylene, propylene and 1-butene; vinyl ketones such as methyl vinyl ketone and ethyl vinyl ketone; vinyl aromatic compounds such as styrene, alphamethylstyrene and vinyltoluene; vinyl ethers such as vinyl ethyl ether and allyl methyl ether; vinylnitriles and vinylidene nitriles such as acrylonitrile and methacrylonitrile; hydroxyl-containing vinyl monomers such as 2-hydroxyethyl acrylate and 4-hydroxybutyl acrylate; cyano-substituted vinyl monomers such as 2-cyanoethyl acrylate, 3-cyanopropyl acrylate and 4-cyanobutyl acrylate; vinylamides and vinylidene amides such as acrylamide, methacrylamide and N-methylolacrylamide; vinylidene acrylates such as methyl methacrylate, ethyl methacrylate and butyl methacrylate; and conjugated dienes such as butadiene and isoprene. At least one of these monomers may be used in combination with the alkyl or alkoxyalkyl acrylate.

Illustrative of the epoxy group-containing acrylate-type elastomer are epoxy group-containing acrylate copolymer elastomers, epoxy group-containing ethylene/acrylate copolymer elastomer, epoxy group-containing ethylene/vinyl acetate/acrylate copolymer elastomer, epoxy group-containing acrylate/acrylonitrile copolymer elastomer, and epoxy group-containing acrylate/butadiene/acrylonitrile copolymer elastomer. These examples, however, are not limitative.

The polycarboxylic acid or its anhydride is a compound having at least two carboxyl groups, and is usually selected from aliphatic, aromatic and alicyclic compounds and low-molecular-weight polymers. Compounds having an aromatic ring and a hetero atom in the main chain may also be used. Non-limitative examples of the polycarboxylic acid and its anhydride are given below.

Examples of aliphatic polycarboxylic acids and their anhydrides include malonic acid, succinic acid, glutaric acid, adipic acid, pimelic acid, azelaic acid, sebacic acid, dodecanedioic acid, tridecanedioic acid, tetradecanedioic acid, octadecanedioic acid, eicosanedioic acid, tartronic acid, methyltartronic acid, methylmalonic acid, ethylmalonic acid, tetramethylsuccinic acid, 2,2'-dimethylsuccinic acid, malic acid, alpha-methylmalic acid, alpha-hydroxyglutaric acid, alpha-hydroxyadipic acid, oxosuccinic acid, 2-oxoadipic acid, acetylmalonic acid, 2-hydroxyglutaric acid, maleic acid, citraconic acid, glutaconic acid, muconic acid, citric acid, tartaric acid, 1,2,3-propanetricarboxylic acid, 1,2,3-propenetricarboxylic acid, 1,3,5-pentanetricarboxylic acid, cystine, aspartic acid, glutamic acid, 2-hydroglutamic acid, iminodiacetic acid, ethylenediaminetetraacetic acid, maleic anhydride, methylmaleic anhydride, succinic anhydride, dodecenylsuccinic anhydride, glutaric anhydride, 2,2′-dimethylglutaric anhydride, sebacic anhydride, azelaic anhydride, dodecanedioic anhydride, eicosanedioic anhydride, citraconic anhydride, cyclomaleic anhydride, diglycollic anhydride and thioglycollic anhydride.

Examples of aromatic polycarboxylic acids and their anhydrides include phthalic acid, 3-methylphthalic acid, terephthalic acid, phthalonic acid, hemipinic acid, benzophenonedicarboxylic acid, phenylsuccinic acid, trimellitic acid, pyromellitic acid, phthalic anhydride, diphenic anhydride, isatonic anhydride, trimellitic anhydride, pyromellitic anhydride, tetrahydrophthalic anhydride, tetrachlorophthalic anhydride and tetrabromophthalic anhydride.

Examples of alicyclic polycarboxylic acids and their anhydrides include hexahydrophthalic acid, hexahydroterephthalic acid, cis-1,3-cyclopentanedicarboxylic acid, cis-1,4-cyclohexanedicarboxylic acid, 1,5-cyclooctanedicarboxylic acid, hexahydrophthalic anhydride, methylhexahydrophthalic anhydride and 1,2-cyclohexanedicarboxylic anhydride.

Examples of the lower-molecular-weight polymers are polybutadiene having carboxyl groups at both ends and butadiene/acrylonitrile copolymer having carboxyl groups at both ends.

Examples of the compounds containing an aromatic ring in the main chain are 7,8-diphenyl-tetradecanedioic acid and its anhydride.

The polycarboxylic acid or its anhydride can be added during, or at the end of, the polymerization reaction for producing the elastomer. Alternatively, it may be mixed with the resulting elastomer together with other compounding chemicals such as a filler by a kneader usually employed in the rubber industry.

The amount of the polycarboxylic acid or its anhydride added is usually 0.1 to 30 parts by weight, preferably 0.1 to 10 parts by weight, per 100 parts by weight of the epoxy group-containing acrylate-type elastomer. The above range of the amount of the polycarboxylic acid or its anhydride is determined in view of the rate of vulcanization and the mechanical properties and permanent compression set of the vulcanizates. Usually, if its amount is less than 1 part by weight, vulcanization scarcely proceeds and a vulcanizate having practical utility cannot be obtained. On the other hand, if it exceeds 30 parts by weight, the rate of vulcanization becomes so slow that it is impossible to obtain a vulcanizate that can be put to practical use.

The quaternary ammonium salt and the quaternary phosphonium salt used in this invention are compounds represented by the following general formula

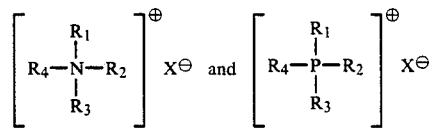

wherein each of $R_1$, $R_2$, $R_3$ and $R_4$ represents a hydrocarbon group, such as an alkyl, aryl, alkylaryl or polyoxyalkylene group, having about 1 to 25 carbon atoms, or two or three of these groups may form a heterocyclic ring together with the nitrogen atom or the phosphorus atom, and X represents an anion derived from an inorganic or organic acid in which acidic hydrogen is bonded to halogen or oxygen. Preferred anions include, for example, Cl, Br, I, $HSO_4$, $H_2PO_4$ $R_3COO$, $R_5OSO_3$, $R_5SO$ and $R_5OPO_3$ ($R_5$ is the same hydrocarbon group as indicated with regard to $R_1$ to $R_4$).

Specific examples of the quaternary ammonium salt include tetraethyl ammonium bromide, tetrabutyl ammonium chloride, tetrabutyl ammonium bromide, tetrabutyl ammonium iodide, n-dodecyltrimethyl ammonium bromide, cetyldimethylbenzyl ammonium chloride, methylcetyldibenzyl ammonium bromide, cetyldimethylethyl ammonium bromide, octadecyltrimethyl ammonium bromide, cetyl pyridium chloride, cetyl pyridium bromide, 1,8-diaza-bicyclo[5.4.0]-undecene-7-methyl ammonium methosulfate, 1,8-diaza-bicyclo[5.4.0]undecene-7-benzyl ammonium chloride, cetyltrimethyl ammonium alkylphenoxypoly(ethyleneoxy)ethyl phosphate, cetylpyridium sulfate, tetraethyl ammonium acetate, trimethylbenzyl ammonium benzoate, trimethylbenzyl ammonium p-toluenesulfonate, and trimethylbenzyl ammonium borate.

Specific examples of the quaternary phosphonium salt include triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, tricyclohexylbenzyl phosphonium chloride, trioctylmethyl phosphonium dimethyl phosphate, tetrabutyl phosphonium bromide, and trioctylmethyl phosphonium acetate.

The quaternary ammonium and phosphonium salts may be used singly or in combination in an amount of usually 0.1 to 10 parts by weight, preferably 0.5 to 5 parts by weight, per 100 parts by weight of the epoxy group-containing acrylate-type elastomer. The above-specified range of the amount of these compounds based on the epoxy group-containing acrylate elastomer is determined in view of the rate of vulcanization, processing stability and the mechanical properties and compression set of the vulcanizate. Usually, if the amount is less than 0.1 part by weight, vulcanization hardly proceeds and a vulcanizate having practical utility cannot be obtained. On the other hand, if the amount exceeds 10 parts by weight, the rate of curing becomes extremely fast, and the processing stability of the elastomer is deteriorated.

Typical examples of the urea used in this invention include urea, methylurea, ethylurea, carbamylurea, 1,1-dimethylurea, 1,1-diethylurea, 1,3-dicyclohexylurea, phenylurea, 1,1-diphenylurea, 1,3-diphenylurea, 1,3-dimethylolurea, acetonhylurea, 1,1,3,3,-tetramethylurea 1,1,3,3-tetraethylurea, 1,1-stearylurea and 3,4-dichlorophenyl-1,1-dimethylurea.

These ureas may be used singly or in combination in an amount of usually 0.1 to 10 parts by weight, preferably 0.1 to 5 parts by weight, per 100 parts by weight the epoxy group-containing acrylate elastomer. The above-specified range of the amount of the urea based on the elastomer is determined in view of the rate of curing, processing stability and the mechanical properties and compression set of the vulcanizate. Usually, if the amount is less than 0.1 part by weight, there is no sufficient effect of regulating the rate of vulcanization. On the other hand, if it exceeds 10 parts by weight, the rate of vulcanization becomes too slow to be practical.

The curable composition of the invention can be prepared by mixing the epoxy group-containing acrylate-type elastomer with the aforesaid vulcanization system and chemicals normally used in the rubber industry such as a reinforcing agent, a filler, a plasticizer, a stabilizer and a processing aid by an ordinary kneader such as a roll mill or a Banbury mixer. The composition is molded into a shape adapted to the purpose for which the composition is finally used. The molded product is vulcanized to form a final product. Vulcanization is carried out usually at a temperature of at least 120° C., preferably about 150° to 220° C. Post-vulcanization may be carried out at a temperature of about 150° to 200° C. for 1 to 24 hours.

The curable acrylate-type elastomer composition of this invention has excellent processing stability to early vulcanization and excellent storage stability and gives a vulcanizate having superior mechanical properties, heat-aging resistance and permanent compression set. Vulcanization systems used heretofore for epoxy group-containing acrylate-type elastomers require post-curing for a relatively long period of time. With the vulcanization system in accordance with this invention, a good permanent compression set can be obtained only by press-curing of the elastomer, and therefore, the post-curing can be drastically shortened, or omitted.

Since vulcanizates obtained from the epoxy group-containing acrylate-type elastomer composition of this invention have excellent heat-aging resistance, permanent compression set, weatherability and water resistance, they can be widely used as various sealing materials (gaskets, packings, O-rings and oil seals), various hoses, diaphragms, various belts and rolls by utilizing these properties.

The following Referential Example and Examples illustrate the present invention more specifically. All parts in these examples are by weight.

REFERENTIAL EXAMPLE

Synthesis of an epoxy group-containing acrylate elastomer:

Using a 10-liter polymerization reactor, the monomeric mixture shown in Table 1 was copolymerized in accordance with the following polymerization recipes (I) and (II). First, the substances in recipe (I) were charged into the reactor, and the pH of the mixture in the reactor was adjusted to 7. With stirring, the temperature in the inside of the reactor was set at 30° C. Dearation and purging with nitrogen were repeated to remove oxygen in the reactor sufficiently. The substances in recipe (II) were then added, and the polymerization was started. The polymerization was terminated in about 10 hours. The polymerization conversion was 98%. The polymerization mixture was salted out, sufficiently washed with water, and dried under reduced pressure to give an epoxy group-containing acrylate copolymer elastomer having a Mooney viscosity ($ML_{1+4}$, 100° C.) of 36.

| Polymerization Recipe (I) | |
|---|---|
| Water | 5000 g |
| Sodium dodecylbenzenesulfonate | 100 g |
| Sodium naphthalenesulfonate | 50 g |
| Sodium sulfate | 15 g |
| Sodium ethylenediaminetetraacetate | 1 g |
| Ferric sodium ethylenediamineacetate | 0.025 g |
| Monomeric mixture (Table 1) | 5000 g |
| Polymerization recipe (II) | |
| $Na_2S_2O_4$ | 1 g |
| Sodium formaldehyde sulfoxylate | 1 g |
| p-Menthane hydroperoxide | 0.5 g |

TABLE 1

| Monomer | Amount (parts) |
|---|---|
| Ethyl acrylate | 48 |
| Butyl acrylate | 30 |
| Methoxyethyl acrylate | 20 |
| Glycidyl methacrylate | 2 |

EXAMPLE 1

One hundred parts of the epoxy group-containing acrylate elastomer, 1 part of stearic acid, 60 parts of MAF carbon black (Seast 116, a product of Tokai Carbon Co., Ltd.), 1 part of an amine-type antioxidant (NAUGARD 445, a product of Uniroyal Inc.) and predetermined amounts of the various vulcanizing agents shown in Table 2 were kneaded by a 6-inch roll mill to prepare a compound.

TABLE 2

| Run No. | Vulcanizing agent | Amount (parts) |
|---|---|---|
| | Invention | |
| 1 | SL-ZO/ODTMAB/urea (*1) (*2) | 1.6/1.8/0.6 |
| 2 | SL-ZO/ODTMAB/phenylurea | 1.6/1.8/1.4 |
| 3 | SL-Z0/ODTMAB/1,3-diphenylurea | 1.6/1.8/2.1 |
| 4 | SL-Z0/ODTMAB/1,3-dimethylolurea | 1.6/1.8/1.2 |
| 5 | SL-ZO/ODTMAB/carbamylurea | 1.6/1.8/1.0 |
| 6 | SL-ZO/ODTMAB/1,3-diethylurea | 1.6/1.8/1.2 |
| | Comparison | |
| 7 | SL-ZO/ODTMAB | 1.6/1.8 |
| 8 | 2-Methylimidazole/hexahydrophthalic anhydride | 0.2/0.8 |
| 9 | Ammonium benzoate | 1.3 |

(*1): SL-ZO is eicosanedioic acid made by Okamura Oil Manufacturing Co.
(*2): ODTMAB is octadecyltrimethyl ammonium bromide.

In each run, the Mooney scorch time of the resulting compound was measured. The compound was press-cured at 170° C. for 20 minutes, and then post-cured in a Geer's oven at 150° C. for 16 hours. The properties of the vulcanizate were measured in accordance with JIS K-6301. The results obtained are shown in Table 3.

These results demonstrate that the vulcanization systems in accordance with the present invention composed of the polycarboxylic acid, the quaternary ammonium salt and the ureas have excellent stability to scorching over the vulcanization system of Comparative Example 7 composed only of the polycarboxylic acid and the quaternary ammonium salt, and that as compared with the conventional vulcanization systems of Comparative Examples 8 and 9, the vulcanization systems in accordance with this invention give an excellent permanent compression set value after press curing at 170° C. for a period of as short as 20 minutes. It is seen from these results that post-curing can be omitted in the present invention.

TABLE 3

| Test item | Run No. Invention | | | | | | Comparison | | |
|---|---|---|---|---|---|---|---|---|---|
| | 1 | 2 | 3 | 4 | 5 | 6 | 7 | 8 | 9 |
| Mooney scorch time (ML 145° C.) | | | | | | | | | |
| t₅ (minutes) | 5.5 | 5.6 | 6.7 | 4.9 | 5.4 | 5.7 | 3.8 | 5.3 | 3.4 |
| t₃₅ (minutes) | 11.4 | 10.7 | 13.1 | 9.4 | 11.3 | 10.3 | 7.7 | 9.5 | 5.5 |
| Lowest viscosity | 41.0 | 40.5 | 38.5 | 41.5 | 43.0 | 39.5 | 45.0 | 44.0 | 49.0 |
| Properties after press vulcanization at 170° C. for 20 minutes | | | | | | | | | |
| Tensile strength (kg/cm²) | 103 | 104 | 102 | 109 | 101 | 105 | 113 | 85 | 111 |
| Elongation (%) | 260 | 260 | 270 | 250 | 260 | 260 | 230 | 310 | 270 |
| 100% Tensile stress (kg/cm²) | 45 | 47 | 43 | 49 | 45 | 44 | 53 | 27 | 48 |
| Hardness (JIS) | 68 | 69 | 68 | 69 | 67 | 68 | 70 | 64 | 66 |
| Properties after post-vulcanization at 150° C. for 16 hours | | | | | | | | | |
| Tensile strength (kg/cm²) | 131 | 125 | 119 | 127 | 126 | 130 | 128 | 139 | 141 |
| Elongation (%) | 170 | 180 | 180 | 190 | 190 | 180 | 170 | 170 | 160 |
| 100% Tensile stress (kg/cm²) | 73 | 74 | 67 | 72 | 73 | 77 | 84 | 85 | 79 |
| Hardness (JIS) | 73 | 73 | 71 | 72 | 72 | 74 | 73 | 75 | 74 |
| Properties after heat aging at 175° C. for 70 hours (press-vulcanized product obtained at 170° C. × 20 min.) | | | | | | | | | |
| Tensile strength (kg/cm²) | 134 | 127 | 123 | 131 | 135 | 132 | 127 | 140 | 145 |
| Elongation (%) | 130 | 140 | 140 | 130 | 140 | 130 | 130 | 130 | 120 |
| Hardness (JIS) | 78 | 77 | 78 | 79 | 78 | 78 | 79 | 81 | 79 |
| Permanent compression set (150° C. × 70 hrs., 25% compression) | | | | | | | | | |
| Press-vulcanizate obtained at 170° C. × 20 min. (%) | 40 | 36 | 31 | 40 | 44 | 37 | 36 | 69 | 70 |
| Post-cured product obtained at 150° C. × 16 hours (%) | 31 | 79 | 19 | 28 | 31 | 22 | 23 | 38 | 41 |

EXAMPLE 2

One hundred parts of the epoxy group-containing acrylate elastomer, 1 part of stearic acid, 60 parts of MAF carbon black, 1 part of an amine-type antioxidant (MAUGARD 445) and predetermined amounts of the vulcanizing agents indicated in Table 4 were kneaded by a 6-inch roll to prepare a compound.

TABLE 4

| Run No. | Vulcanizing agent | Amount (parts) |
|---|---|---|
| | Invention | |
| 11 | Glutaric acid/ODTMAB/1,3-diphenyl-urea | 0.7/1.8/2 |
| 12 | Glutaric acid/ODTMAB/1,3-diphenyl-urea | 0.6/1.8/2 |
| 13 | Hexahydrophthalic anhydride/ODTMAB/1,3-diphenylurea | 0.8/1.8/2 |
| 14 | SL-ZO/TBPB (*3)/1,3-diphenylurea | 1.6/1.5/2 |
| 15 | SL-ZO/cetyl pyridium bromide/1,3-dipenylurea | 1.6/1.6/2 |
| | Comparison | |
| 16 | Glutaric acid/ODTMAB | 0.7/2 |
| 17 | Glutaric anhydride/ODTMAB | 0.6/2 |
| 18 | Hexahydrophthalic anhydride/ODTMAB | 0.8/2 |
| 19 | SL-ZO/tetrabutyl phosphonium bromide | 1.6/2 |
| 20 | SL-ZO/cetyl pyridium bromide | 1.6/2 |

(*3): TBPB is tetrabutyl phosphonium bromide.

The Mooney scorch time of the resulting compound was measured, and the compound was press-cured at 170° C. for 20 minutes and then post-cured in a Geer's oven at 150° C. for 16 hours. The properties of the vulcanizate were measured as in Example 1. The results are shown in Table 5.

It is seen from these results that the vulcanizates of this invention composed of the polycarboxylic acid anhydride, the quaternary ammonium salt and the urea (Runs Nos. 12 and 13 of the invention) have better stability to scorching than the vulcanization systems composed only of the polycarboxylic acid anhydride and the quaternary ammonium salt (Runs Nos. 17 and 18 for comparison). It is also seen that even when the quaternary phosphonium salt is used, the scorch stability is better (by comparison of Run No. 14 of the invention with Run 19 for comparison).

TABLE 5

| Test item | Run No. Invention | | | | | Comparison | | | | |
|---|---|---|---|---|---|---|---|---|---|---|
| | 11 | 12 | 13 | 14 | 15 | 16 | 17 | 18 | 19 | 20 |
| Mooney scorch time (ML 145° C.) | | | | | | | | | | |
| t₅ (minutes) | 6.0 | 5.6 | 5.3 | 6.2 | 6.8 | 3.5 | 3.1 | 3.0 | 2.9 | 4.3 |
| t₃₅ (minutes) | 10.9 | 12.7 | 12.0 | 12.2 | 13.5 | 6.1 | 5.3 | 5.0 | 4.0 | 8.1 |
| Lowest viscosity | 40.0 | 41.5 | 41.5 | 39.5 | 38.0 | 45.0 | 49.0 | 49.0 | 70.5 | 44.0 |
| Properties after press vulcanization at 170° C. for 20 minutes | | | | | | | | | | |
| Tensile strength (kg/cm²) | 109 | 110 | 103 | 112 | 103 | 118 | 119 | 114 | 120 | 112 |
| Elongation (%) | 260 | 260 | 270 | 220 | 270 | 220 | 220 | 230 | 190 | 240 |
| 100% Tensile stress (kg/cm²) | 45 | 46 | 43 | 57 | 42 | 55 | 56 | 53 | 79 | 51 |
| Hardness (JIS) | 68 | 67 | 67 | 69 | 68 | 70 | 69 | 67 | 72 | 69 |
| Properties after post-vulcanization at 150° C. for 16 hours | | | | | | | | | | |
| Tensile strength (kg/cm²) | 119 | 120 | 115 | 117 | 118 | 130 | 131 | 127 | 124 | 127 |
| Elongation (%) | 180 | 170 | 180 | 160 | 180 | 170 | 160 | 170 | 150 | 170 |
| 100% Tensile stress (kg/cm²) | 65 | 66 | 63 | 69 | 67 | 82 | 83 | 80 | 89 | 83 |

TABLE 5-continued

| | Run No. | | | | | | | | | |
|---|---|---|---|---|---|---|---|---|---|---|
| | Invention | | | | | Comparison | | | | |
| Test item | 11 | 12 | 13 | 14 | 15 | 16 | 17 | 18 | 19 | 20 |
| Hardness (JIS) | 71 | 72 | 72 | 74 | 71 | 71 | 72 | 72 | 75 | 73 |
| Properties after heat aging at 175° C. for 70 hours (press-vulcanized product obtained at 170° C. × 20 min.) | | | | | | | | | | |
| Tensile strength (kg/cm²) | 118 | 119 | 114 | 121 | 120 | 119 | 121 | 118 | 124 | 126 |
| Elongation (%) | 140 | 140 | 140 | 120 | 140 | 120 | 120 | 120 | 140 | 120 |
| Hardness (JIS) | 78 | 77 | 76 | 79 | 78 | 79 | 78 | 79 | 81 | 79 |
| Permanent compression set (150° C. × 70 hrs., 25% compression) | | | | | | | | | | |
| Press-vulcanizate obtained at 170° C. × 20 min. (%) | 31 | 35 | 36 | 37 | 32 | 34 | 34 | 37 | 39 | 37 |
| Post-cured product obtained at 150° C. × 16 hours (%) | 25 | 29 | 28 | 30 | 20 | 24 | 22 | 24 | 29 | 24 |

EXAMPLE 3

One hundred parts of the epoxy group-containing acrylate elastomer, 1 part of stearic acid, 60 parts of MAF carbon black, 1 part of an amine-type antioxidant (NAUGARD 445) and predetermined amounts of the vulcanizing agents indicated in Table 6 were kneaded by a 6-inch roll mill to prepare a compound.

TABLE 6

| Run No. | Vulcanizing agent | Amount (parts) |
|---|---|---|
| | Invention | |
| 21 | SL-ZO/ODTMAB/1,3-diphenylurea | 1.6/1.8/0.2 |
| 22 | SL-ZO/ODTMAB/1,3-diphenylurea | 1.6/1.8/1 |
| 23 | SL-ZO/ODTMAB/1,3-diphenylurea | 1.6/1.8/1.6 |
| | Comparison | |
| 7 | SL-ZO/ODTMAB | 1.6/1.8 |

The Mooney scorch time of the resulting compound was measured, and a vulcanizate was prepared as in Example 1. The properties of the vulcanizate were measured as in Example 1. The results are shown in Table 7.

TABLE 7

| | Run No. | | | |
|---|---|---|---|---|
| | Invention | | | Comparative Example |
| Test item | 21 | 22 | 23 | 7 |
| Mooney scorch time (ML 145° C.) | | | | |
| t₅ (minutes) | 4.2 | 4.9 | 11.8 | 3.8 |
| t₃₅ (minutes) | 7.9 | 9.1 | 34.6 | 7.7 |
| Lowest viscosity | 45.5 | 41.0 | 31.5 | 45.0 |
| Properties after press vulcanization at 170° C. for 20 minutes | | | | |
| Tensile strength (kg/cm²) | 112 | 109 | 79 | 113 |
| Elongation (%) | 230 | 250 | 390 | 230 |
| 100% Tensile stress (kg/cm²) | 53 | 48 | 25 | 53 |
| Hardness (JIS) | 70 | 69 | 63 | 70 |
| Properties after post-vulcanization at 150° C. for 16 hours | | | | |
| Tensile strength (kg/cm²) | 129 | 121 | 116 | 128 |
| Elongation (%) | 170 | 190 | 190 | 170 |
| 100% Tensile stress (kg/cm²) | 83 | 75 | 65 | 84 |
| Hardness (JIS) | 73 | 72 | 68 | 73 |
| Properties after heat aging at 175° C. for 70 hours (press-vulcanized product obtained at 170° C. × 20 min.) | | | | |
| Tensile strength (kg/cm²) | 127 | 119 | 118 | 127 |
| Elongation (%) | 130 | 140 | 130 | 130 |
| Hardness (JIS) | 78 | 79 | 77 | 79 |
| Permanent compression set (150° C. × 70 hrs., 25% compression) | | | | |
| Press-vulcanizate obtained at 170° C. × 20 min. (%) | 35 | 32 | 54 | 36 |
| Post-cured product obtained at 150° C. × 16 hours (%) | 22 | 24 | 34 | 23 |

The results show that if the amount of the urea blended is small, the effect of regulating the rate of vulcanization is not sufficient, and on the other hand, the excessive use of the urea makes the rate of vulcanization slow, and the properties of the vulcanizate are greatly deteriorated.

EXAMPLE 4

One hundred parts of an epoxy group-containing ethylene/vinyl acetate/butyl acrylate copolymer elastomer synthesized by a known method (the composition, in weight percent, calculated from the chemical shifts of ¹³C-NBMR was: ethylene 21, vinyl acetate 37, butyl acrylate 40.5 and glycidyl methacrylate 1.5), 1 part of stearic acid, 60 parts of MAF carbon black, 1 part of an amine-type antioxidant and predetermined amounts of the vulcanizing agents shown in Table 8 were kneaded by a 6-inch roll mill to prepare a compound. The Mooney scorch time of the resulting compound was prepared. A vulcanizate was produced from the compound as in Example 1, and its properties were measured. The results obtained are shown in Table 9.

TABLE 8

| Run No. | Vulcanizing agent | Amount (parts) |
|---|---|---|
| | Invention | |
| 31 | SL-ZO/ODTMAB/1,3-diphenylurea | 1.7/1.8/2 |
| 32 | Hexahydropthalic anhydride/ODTMAB/phenylurea | 0.8/1.8/2 |
| | Comparison | |
| 33 | SL-ZO/ODTMAB | 1.7/1.8 |
| 34 | Hexahydrophthalic anhydride/ODTMAB | 0.2/0.8 |
| 35 | 2-Methylimidazole/hexahydrophthalic anhydride | 0.20/0.8 |

TABLE 9

| | Run No. | | | | |
|---|---|---|---|---|---|
| | Invention | | Comparison | | |
| Test item | 31 | 32 | 33 | 34 | 35 |
| Mooney scorch time (ML 145° C.) | | | | | |
| t₅ (minutes) | 6.5 | 5.4 | 4.2 | 3.2 | 5.4 |
| t₃₅ (minutes) | 13.3 | 12.5 | 7.9 | 5.4 | 10.1 |
| Lowest viscosity | 36.5 | 41.5 | 43.0 | 47.0 | 44.5 |
| Properties after press vulcanization at 170° C. for 20 minutes | | | | | |
| Tensile strength (kg/cm²) | 107 | 110 | 119 | 121 | 100 |
| Elongation (%) | 490 | 480 | 460 | 450 | 450 |
| 100% Tensile stress (kg/cm²) | 29 | 30 | 34 | 35 | 31 |
| Hardness (JIS) | 66 | 67 | 68 | 68 | 67 |
| Properties after post-vulcanization at 150° C. for 16 hours | | | | | |
| Tensile strength | 133 | 138 | 142 | 148 | 139 |

TABLE 9-continued

| | Run No. | | | | |
|---|---|---|---|---|---|
| | Invention | | Comparison | | |
| Test item | 31 | 32 | 33 | 34 | 35 |
| (kg/cm$^2$) | | | | | |
| Elongation (%) | 330 | 340 | 310 | 300 | 270 |
| 100% Tensile stress (kg/cm$^2$) | 41 | 41 | 48 | 47 | 56 |
| Hardness (JIS) | 70 | 71 | 71 | 72 | 73 |
| Properties after heat aging at 175° C. for 70 hours (press vulcanized product obtained at 170° C. × 20 min.) | | | | | |
| Tensile strength (kg/cm$^2$) | 138 | 140 | 147 | 143 | 146 |
| Elongation (%) | 240 | 250 | 240 | 230 | 190 |
| Hardness (JIS) | 76 | 77 | 76 | 77 | 76 |
| Permanent compression set (150° C. × 70 hrs., 25% compression) | | | | | |
| Press-vulcanizate obtained at 170° C. × 20 min. (%) | 31 | 36 | 35 | 36 | 68 |
| Post-cured product obtained at 150° C. × 16 hours (%) | 20 | 29 | 23 | 25 | 37 |

EXAMPLE 5

One hundred parts of an epoxy group-containing ethylene/vinyl acetate/butyl acrylate copolymer elastomer synthesized by a known method (the composition, in weight percent, calculated from the chemical shifts of $^{13}$C-NBMR was: ethylene 40, methyl acrylate 58.1 and glycidyl methacrylate 1.9), 1 part of stearic acid, 45 parts of MAF carbon black, 1 part of an amine-type antioxidant (NAUGARD 445) and predetermined amounts of the vulcanizing agents shown in Table 10 were kneaded by a 6-inch roll mill to prepare a compound. The Mooney scorch time of the resulting compound was prepared. A vulcanizate was produced from the compound as in Example 1, and its properties were measured. The results obtained are shown in Table 11.

TABLE 10

| Run No. | Vulcanizing agent | Amount (parts) |
|---|---|---|
| | Invention | |
| 41 | SL-ZO/ODTMAB/1,3-diphenylurea | 2.2/2/2 |
| 42 | Hexahydrophthalic anhydride/ ODTMAB/phenylurea | 1.0/2/2 |
| | Comparison | |
| 43 | SL-ZO/ODTMAB | 2.2/2 |
| 44 | Hexahydrophthalic anhydride/ ODTMAB | 1.0/2 |
| 45 | Ammonium benzoate | 1.3 |

TABLE 11

| | Run No. | | | | |
|---|---|---|---|---|---|
| | Invention | | Comparison | | |
| Test item | 41 | 42 | 43 | 44 | 45 |
| Mooney scorch time (ML 145° C.) | | | | | |
| t$_5$ (minutes) | 6.0 | 5.7 | 4.8 | 4.5 | 4.2 |
| t$_{35}$ (minutes) | 106 | 11.8 | 10.6 | 9.1 | 6.9 |
| Lowest viscosity | 25.5 | 26.0 | 27.0 | 27.5 | 29.0 |
| Properties after press vulcanization at 170° C. for 20 minutes | | | | | |
| Tensile strength (kg/cm$^2$) | 150 | 156 | 161 | 165 | 136 |
| Elongation (%) | 530 | 520 | 490 | 480 | 570 |
| 100% Tensile stress (kg/cm$^2$) | 29 | 30 | 32 | 33 | 29 |
| Hardness (JIS) | 64 | 64 | 65 | 66 | 64 |
| Properties after post-vulcanization at 150° C. for 16 hours | | | | | |
| Tensile strength (kg/cm$^2$) | 160 | 164 | 171 | 178 | 174 |
| Elongation (%) | 370 | 360 | 350 | 340 | 360 |
| 100% Tensile stress (kg/cm$^2$) | 42 | 43 | 44 | 45 | 50 |
| Hardness (JIS) | 69 | 70 | 70 | 71 | 71 |
| Properties after heat aging at 175° C. for 70 hours (press-vulcanized product obtained at 170° C. × 20 min.) | | | | | |
| Tensile strength (kg/cm$^2$) | 142 | 148 | 153 | 151 | 161 |
| Elongation (%) | 290 | 260 | 250 | 240 | 230 |
| Hardness (JIS) | 72 | 72 | 71 | 72 | 76 |
| Permanent compression set (150° C. × 70 hrs., 25% compression) | | | | | |
| Press-vulcanizate obtained at 170° C. × 20 min. (%) | 35 | 38 | 40 | 39 | 75 |
| Post-cured product obtained at 150° C. × 16 hours (%) | 21 | 23 | 19 | 19 | 47 |

What is claimed is:

1. A curable elastomeric composition comprising an epoxy group-containing acrylate-type elastomer in combination with (1) a polycarboxylic acid or its anhydride, (2) a quaternary ammonium or phosphonium salt and (3) a urea.

2. The composition of claim 1 which contains 0.1 to 30 parts by weight of the polycarboxylic acid or its anhydride (1), 0.1 to 10 parts by weight of the quaternary ammonium or phosphonium salt (2) and 0.1 to 10 parts by weight of the urea (3) per 100 parts by weight of the elastomer.

3. The composition of claim 1 which contains 0.1 to 10 parts by weight of the polycarboxylic acid or its anhydride (1), 0.5 to 5 parts by weight of the quaternary ammonium or phosphonium salt (2) and 0.1 to 5 parts by weight of the urea (3) per 100 parts by weight of the elastomer.

4. The composition of claim 1, wherein said epoxy group-containing acrylate-type elastomer is prepared by polymerizing:

0.1 to 10% by weight of an epoxy group-containing monomer selected from the group consisting of glycidyl acrylate, glycidyl methacrylate, vinyl glycidyl ether, allyl glycidyl ether and methallyl glycidyl ether;

30 to 99.9% by weight of at least one monomer selected from the group consisting of alkyl acrylates, wherein the alkyl group contain 1 to 8 carbon atoms, and alkoxyalkyl acrylates, wherein the alkoxy moiety contains 1 to 4 carbon atoms and the alkyl moiety contains 1 to 4 carbon atoms; and 0 to 70% by weight of at least one monomer selected from the group consisting of vinyl acetate, vinyl propionate, vinyl butyrate, ethylene, propylene, 1-butene, methyl vinyl ketone, ethyl vinyl ketone, styrene, alpha-methylstyrene, vinyl toluene, vinyl ethyl ether, allyl methyl ether, acrylonitrile, methacrylonitrile, 2-hydroxyethyl acrylate, 4-hydroxybutyl acrylate, 2-cyanoethyl acrylate, 3-cyanopropyl acrylate, 4-cyanobutyl acrylate, acrylamide, methacrylamide, N-methylolacrylamide, methyl methacrylate, ethyl methacrylate, butyl methacrylate, butadiene and isoprene.

5. The composition of claim 4, wherein said epoxy group-containing monomer is present in an amount of 0.5 to 3% by weight.

6. The composition of claim 1, wherein said polycarboxylic acid or its anhydride is selected from the group consisting of malonic acid, succinic acid, glutaric acid, adipic acid, pimelic acid, azelaic acid, sebacic acid, dodecanedioc acid, tridecanedioic acid, tetradecanedioic acid, octadecanedioic acid, eicosanedioic acid, tartronic acid, methyltartronic acid, methylmalonic acid, ethylmalonic acid, tetramethylsuccinic acid, 2,2′-dimethylsuccinic acid, malic acid, alpha-methylmalic acid, alpha-hydroxyglutaric acid, alpha-hydroxyadipic acid, oxosuccinic acid, 2-oxoadipic acid, acetylmalonic acid, 2-hydroxyglutaric acid, maleic acid, citraconic acid, glutoconic acid, muconic acid, citric acid, tartaric acid, 1,2,3-propanetricarboxylic acid, 1,3,5-pentanetricarboxylic acid, cystine, aspartic acid, glutamic acid, 2-hydroglutamic acid, iminodiacetic acid, ethylenediaminetetraacetic acid, maleic anhydride, methylmaleic anhydride, succinic anhydride, dodecenylsuccinic anhydride, glutaric anhydride, 2,2′-dimethylglutaric anhydride, sebacic anhydride, azelaic anhydride, dodecanedioic anhydride, eicosanedioic anhydride, citraconic anhydride, cyclomaleic anhydride, diglycollic anhydride and thioglycollic anhydride.

7. The composition of claim 1, wherein said polycarboxylic acid or its anhydride is selected from the group consisting of phthalic acid, 3-methyl-phthalic acid, terephthalic acid, phthalonic acid, hemipinic acid, benzophenonedicarboxylic acid, phenylsuccinic acid, trimellitic acid, pyromellitic acid, phthalic anhydride, diphenic anhydride, isotonic anhydride, trimetallic anhydride, pyromellitic anhydride, tetrahydrophthalic anhydride, tetrachlorophthalic anhydride and tetrabromophthalic anhydride.

8. The composition of claim 1, wherein said polycarboxylic acid or its anhydride is selected from the group consisting of hexahydrophthalic acid, hexahydroterephthalic acid, cis-1,3-cyclopentanedicarboxylic acid, cis-1,4-cyclohexanedicarboxylic acid, 1,5-cyclooctanedicarboxylic acid, hexahydrophthalic anhydride, methylhexahydrophthalic anhydride and 1,2-cyclohexanedicarboxylic anhydride.

9. The composition of claim 1, wherein said polycarboxylic acid or its anhydride is selected from the group consisting of carboxy-terminated polybutadiene and carboxy-terminated butadiene/acrylonitrile copolymer.

10. The composition of claim 1, wherein said quaternary ammonium salt is represented by the formula

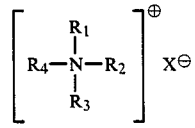

and said quaternary phosphonium salt is represented by the formula

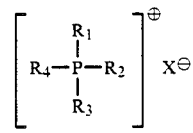

wherein each of $R_1$, $R_2$, $R_3$ and $R_4$ represents an alkyl group of 1 to 25 carbon atoms, an aryl group of 1 to 25 carbon atoms, an alkylaryl group of 1 to 25 carbon atoms or a polyoxyalkylene group of 1 to 25 carbon atoms; or two to three of $R_1$, $R_2$, $R_3$ and $R_4$, together with the nitrogen atom or phosphorous atom to which they are attached, may form a heterocyclic ring; and X represents an anion of an inorganic or organic acid in which acidic hydrogen is bonded to halogen or oxygen.

11. The composition of claim 10, wherein said quaternary ammonium salt is selected from the group consisting of tetraethyl ammonium bromide, tetrabutyl ammonium chloride, tetrabutyl ammonium bromide, tetrabutyl ammonium iodide, n-dodecyltrimethyl ammonium bromide, cetyldimethylbenzyl ammonium chloride, methylcetyldibenzyl ammonium bromide, cetyldimethylethyl ammonium bromide, octadecyltrimethyl ammonium bromide, cetyl pyridinium chloride, cetyl pyridinium bromide, 1,8-diaza-bicyclo[5.4.0]undecene-7-methyl ammonium methosulfate, 1,8-diaza-bicyclo[5.4.0]undecene-7-benzyl ammonium chloride, cetyltrimethyl ammonium alkylphenoxy-poly(ethyleneoxy)ethyl phosphate, cetylpyridinium sulfate, tetraethyl ammonium acetate, trimethylbenzyl, ammonium benzoate, trimethylbenzyl ammonium p-toluene-sulfonate and trimethylbenzyl ammonium borate.

12. The composition of claim 10, wherein said quaternary phosphonium salt is selected from the group consisting of triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, tricyclohexylbenzyl phosphonium chloride, trioctylmethyl phosphonium dimethyl phosphate, tetrabutyl phosphonium bromide and trioctyl methyl phosphonium acetate.

13. The composition of claim 1, wherein said urea is selected from the group consisting of urea, methylurea, ethylurea, carbamylurea, 1,1-dimethylurea, 1,1-diethylurea, 1,3-dicyclohexylurea, phenylurea, 1,1-diphenylurea, 1,3-diphenylurea, 1,3-dimethylolurea, acetonylurea, 1,1,3,3-tetramethyl urea, 1, 1, 3, 3-tetraethyl urea, 1,1-distearyl urea and 3,4-dichlorophenyl-1,1-dimethyl urea.

* * * * *

UNITED STATES PATENT AND TRADEMARK OFFICE
CERTIFICATE OF CORRECTION

PATENT NO. : 4,931,509

DATED : June 5, 1990

INVENTOR(S) : SHIGELU YAGISHITA ET AL.

It is certified that error appears in the above-identified patent and that said Letters Patent is hereby corrected as shown below:

Column 12, line 50 (Claim 4, line 11), "contain" should read --contains--.

Column 13, line 31 (Claim 7, line 7), "isotonic" should read --isatonic--.

Column 14, line 15 (Claim 10, line 15), "to" should read --or--.

Column 14, lines 52 and 53 (Claim 13, lines 6 and 7), "1, 1, 3, 3-tetraethyl" should read --1,1,3,3-tetraethyl--.

Signed and Sealed this

Fifteenth Day of October, 1991

*Attest:*

HARRY F. MANBECK, JR.

*Attesting Officer*   *Commissioner of Patents and Trademarks*